United States Patent [19]

Anjan et al.

[11] Patent Number: 5,245,400

[45] Date of Patent: Sep. 14, 1993

[54] FIBER OPTIC POLARIZATION MAINTAINING FUSED COUPLER FABRICATING APPARATUS

[75] Inventors: Yellapu Anjan; Sam Habbel, both of Scottsdale; Joseph F. Straceski, Phoenix, all of Ariz.

[73] Assignee: Honeywell Inc., Minneapolis, Minn.

[21] Appl. No.: 805,359

[22] Filed: Dec. 9, 1991

[51] Int. Cl.$^5$ .................. G01N 21/84; G01N 21/21
[52] U.S. Cl. .................. 356/73.1; 250/227.17
[58] Field of Search ............... 356/73.1; 250/227.11, 250/227.17

[56] References Cited

U.S. PATENT DOCUMENTS

| | | |
|---|---|---|
| 4,482,203 | 11/1984 | Stowe et al. |
| 4,714,316 | 12/1987 | Moore et al. |
| 4,801,185 | 1/1989 | Bricheno |
| 4,932,740 | 6/1990 | Berkey et al. |
| 4,992,122 | 2/1991 | Rayit ................................ 156/158 |
| 4,997,247 | 3/1991 | Stowe |

FOREIGN PATENT DOCUMENTS 61-148332 7/1986 Japan .................................. 356/73.1

OTHER PUBLICATIONS

Chinone et al., "Elasto-optic polarization measurement in Optical Fiber", Optics Letters/vol. 6, No. 1, Jan. 1981, pp. 16–18.

S. L. A. Carrara, B. Y. Kim and H. J. Shaw, "Elasto-optic alignment of birefringent axes in polarization-holding optical fiber", Jul. 1986, pp. 470–472.

Primary Examiner—Vincent P. McGraw
Attorney, Agent, or Firm—Mark J. Gebhardt

[57] ABSTRACT

A fiber optic polarization maintaining apparatus for use in fabrication of fused optical couplers, where the fused optical couplers include first and second optical fibers which each have a principle axis. A light launching source is coupled through a lens into a first end of a selected one of the first and second optical fibers. A piezoelectric element in combination with a solenoid applies external stress in the form of an AC modulation signal to the selected one of the first and second optical fibers. A rotating apparatus rotates the selected one of the first and second optical fibers during modulation. Apparatus for collimating light is coupled to a second end of the selected fiber. Apparatus for analyzing the collimated light is coupled to the collumating apparatus, apparatus for detecting power is coupled to the analyzing means, and an output of the power detecting apparatus is coupled to an apparatus for determining when the principle axis of the selected fiber is aligned in the direction of the externally applied stress by detecting a null output from the power detecting apparatus.

17 Claims, 11 Drawing Sheets

FIBER OPTIC POLARIZATION MAINTAINING FUSED COUPLER FABRICATING APPARATUS

FIELD OF INVENTION

This invention relates to apparatus for fabricating fiber optic polarization maintaining fused couplers. More particularly, this invention relates to the fabrication of 30 mm long polarization maintaining fused optical couplers.

BACKGROUND OF THE INVENTION

Polarization maintaining (PM) fiber optic single mode couplers are critical components for both interferometric and resonator type fiber-optic gyroscopes (FOG's). In a 2×2 PM coupler, light launched along either of the principal axes of a fiber is split into two parts as the output. The quality of a PM coupler is judged by the amount of additional loss it introduces and by its capability to maintain the polarization state launched at the input end. There are two ways of fabricating couplers: mechanical-lapped type, and fused-tapered type. In both the methods aligning of birefringent principal axes of the two fibers forming the coupler is necessary. The mechanical-lapped type involves embedding an unjacketed fiber in a grooved quartz block and mechanically lapping and polishing the block until the fiber core is reached. Two such blocks are bonded together to form a coupler. Low excess loss, high extinction ratio lapped PM couplers have been demonstrated but typically maintain such performance only over a limited temperature range. In addition, lapped coupler fabrication is labor intensive and time consuming making production quite expensive.

The fuse-tapered couplers, on the other hand, are fabricated by fusing a section of two fibers and stretching them until the required power splitting ratio is reached. The fabrication of single mode fused PM couplers involves alignment of birefringent axes of the fibers in addition to fusion and tapering of fibers. Since fusion and tapering produces a single piece of glass in the coupling region, fused couplers generally perform better over environment than do lapped ones. Ease of fabrication also offers significant production cost reductions over lapped couplers.

Maintaining the polarization through the coupling region requires accurate alignment of the fibers prior to fusion and tapering. Any advertently caused misalignment during fusion must be kept low by locally heating the fibers at the line of contact. The key to successfully making fused PM couplers is the apparatus and tooling needed for alignment, fusion and tapering. Also, attainment of high performance PM fused couplers requires the index of the birefringent stress members to be fairly matched with that of the cladding and the use of small (about 80 $\mu$m) cladding diameter fiber.

Using the apparatus and tooling, which are described in detail below, packaged fused PM couplers as short as 25 mm in length 2.5 mm in diameter are produced. Typically the extinction ratios of the couplers are better then 20 dB in both the through and coupled output ports, and the excess losses are less than 0.5 dB.

SUMMARY OF THE INVENTION

An apparatus for use in fabrication of polarization-maintaining fused fiber optic couplers, where the fused optical couplers include first and second optical fibers which each have a principle axis. A light launching source is coupled through a lens into a first end of a selected one of the first and second optical fibers. A piezoelectric element in combination with a solenoid applies external stress in the form of an AC modulation signal to the selected one of the first and second optical fibers. A rotating apparatus rotates the selected one of the first and second optical fibers during modulation. Apparatus for collimating light is coupled to a second end of the selected fiber. Apparatus for analyzing the collimated light is coupled to the collimating apparatus, apparatus for detecting power is coupled to the analyzing means, and an output of the power detecting apparatus is coupled to an apparatus for determining when the principle axis of the selected fiber is aligned in the direction of the externally applied stress by detecting a null output from the power detecting apparatus.

It is one object of the present invention to provide an apparatus for consistently fabricating fiber optic PM fused couplers with yields of greater than 90%.

BRIEF DESCRIPTION OF THE DRAWINGS

The invention may be more easily understood in reference to the drawing wherein like numerals represent like elements.

DESCRIPTION OF THE PREFERRED EMBODIMENT

Fiber Alignment System

Alignment of preferred birefringent axis of the coupler fiber is a precursor to the fusion-and-tapering process. Accurate alignment of the birefringent axes of the two fibers at the pre-determined locations of fibers was accomplished with the in-house developed computer controlled fiber alignment setup. The setup is capable of determining slow or fast axis of the coupler fiber to better than 0.1 degree accuracy. The fibers are prepared for alignment by the following step by step procedure.

1. Stripping away 20 mm length of the fiber jacket at the center of two fibers, each of which is 2 meters long.
2. Cleaning the stripped regions such that all contaminations and the jell particles from the jacket are removed.

Figure 1:
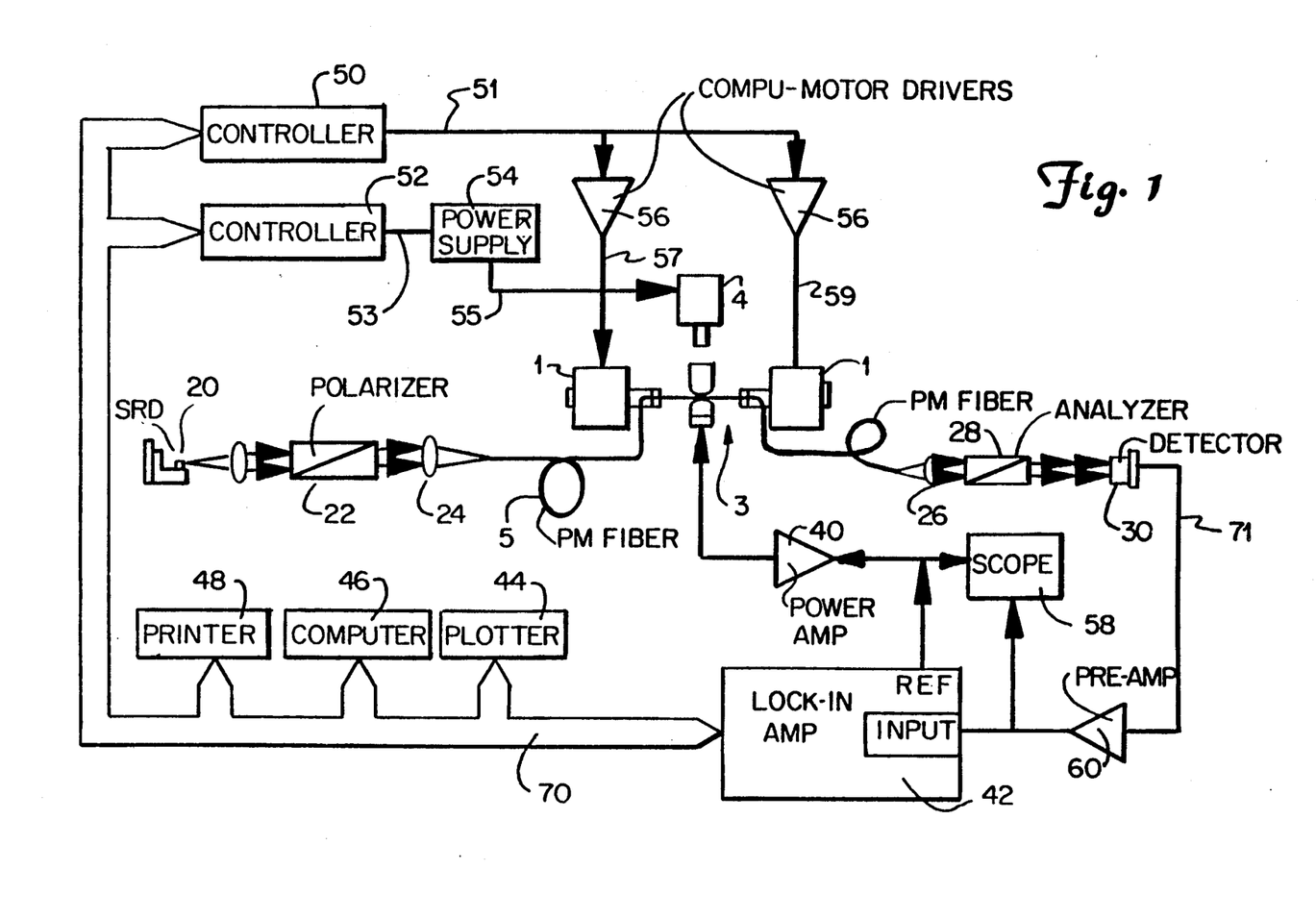
FIG. 1 shows a schematic block diagram of the fiber alignment system.

FIG. 1 shows a schematic diagram of the polarization-maintaining fiber alignment system, which is capable of determining the birefringent axis orientation to within 0.1 degree accuracy. Determination of the slow or fast axis of a PM fiber is based on the principle of elasto-optic effect described in Carrara et al.: "Elasto-optic alignment of birefringent axes in polarization-holding optical fiber", Optics Letters, Vol. 11, pp. 470–472 (1986).

Figure 1A:
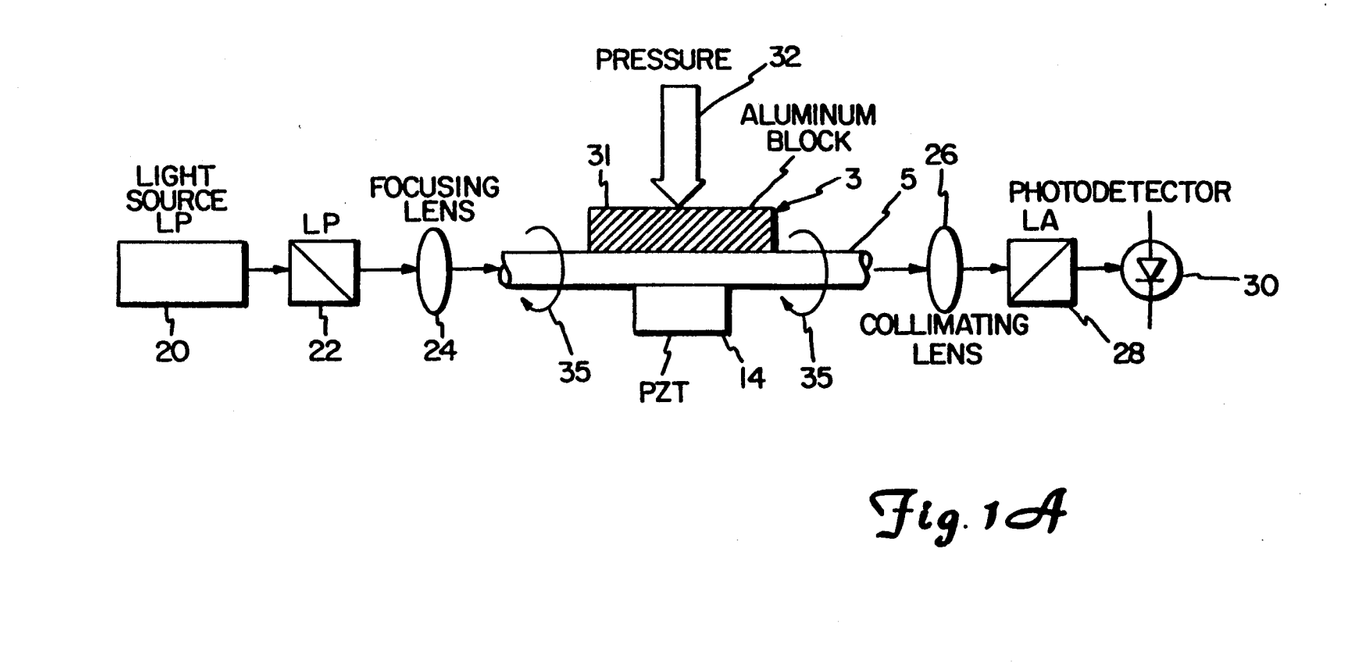
FIG. 1A shows a simplified schematic block diagram of the principle components of the fiber alignment system of the invention.

As shown in FIG. 1 and the simplified schematic block diagram of FIG. 1A, the polarization-maintaining fiber alignment system of the invention comprises a light source (20), a polarizer (22), a focusing lens (24), a PZT squeezer (3), a collimating lens (26), an analyzer or polarizer (28) and a photodetector (30). The PZT squeezer further comprises a piezoelectric element (14) and an aluminum block (31). Pressure as indicated by arrow (32) is exerted through the aluminum block onto a fiber (5) which is rotated during processing as indicated generally by arrows (35).

Referring particularly now to FIG. 1, the fiber alignment system of the invention further includes controllers (50), (52), a power supply (54), first and second compu-motor drivers (56), a solenoid (4), and first and second stepper motors (1). A printer (48), computer (46) and plotter (44) communicate with each other, the controllers (50), (52) and the lock-in amplifier (42) through bus (70). The first controller (50) is operated by computer (46) to supply control signals (51) to the compu-motor drivers (56). The compu-motors, in turn, generate control signals (57), (59) to run the first and second stepper motors (1), respectively. The second controller (52) provides control signals (53) to the power supply (54) which then generates an AC modulation signal (55) to drive solenoid (4). An oscilloscope (58) may advantageously be connected to the ouput of pre-amp (60) and power amp (40) using a reference signal from lock-in amplifier (42) to monitor the process.

The light source (20) may advantageously comprise a super-radiant diode (SRD) which launches light along one of the principal axes of the fiber using a polarizer and a lens as shown in FIG. 1. The fiber is then passed through the PZT squeezer (3) which is modulated at 20 KHZ using an amplified signal obtained from lock-in amplifier (42) and power amplifier (40). The AC stress field resulting from the squeezer modulates the birefringence of the fiber and hence the state of polarization of light exiting the fiber. The exit beam is collimated and passed through a second polarizer (28) which is positioned 90 degrees to the polarized light passing through the unperturbed fiber that was not squeezed. The AC modulation of birefringence creates an intensity modulated beam which is synchronously detected with the photodetector (30) and the lock-in amplifier (42).

Figure 3:
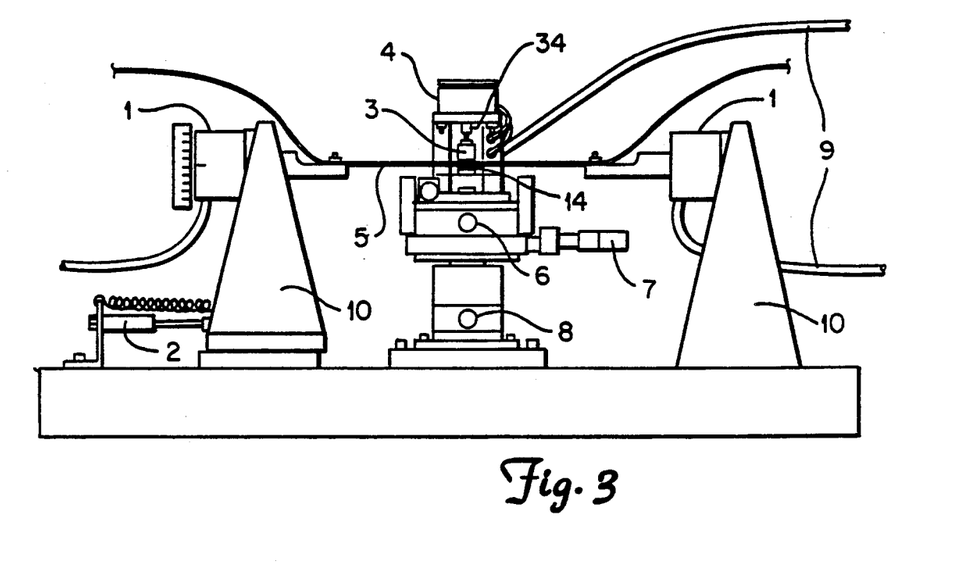
FIG. 3 shows assembled hardware needed for rotating and squeezing of the fiber alignment system.
Figures 4A, 4B:
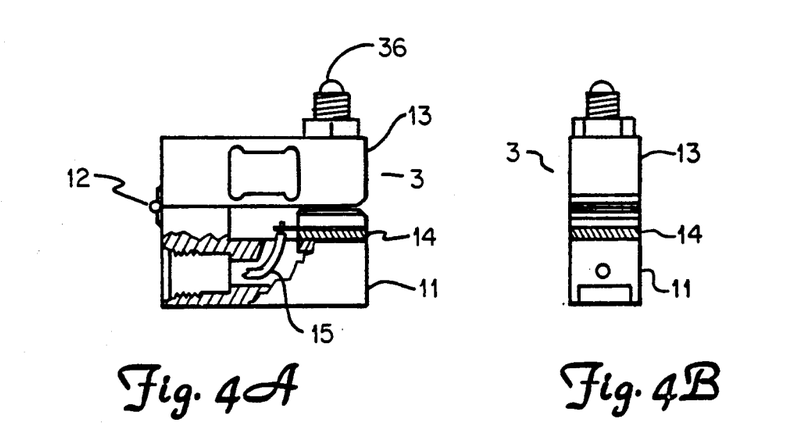
FIGS. 4A and 4B show a front and side view of the squeezer of the fiber alignment system.

The developed hardware for rotation and squeezing of the fiber is shown in FIG. 3. The polarization-maintaining fiber (5) to be aligned is clamped in a pair of precision rotation stepper motors (1). The resolution of the motors is 0.014 degrees per step. One of the motor mounted pedestals (10) is anchored to a linear stage which is spring loaded to provide a slight tension on the fiber. A small dashpot (2) dampens unwanted motion and reduces fiber breakage due to any slight disturbance transmitted to the fiber. Heart of the alignment system is the squeezer (3) and a magnified front and side views of the squeezer are shown in FIGS. 4A and 4B. It consists of an L-shaped 303 stainless steel base (11), a pair of flexible hinges (12), and an upper jaw (13). The PZT element (14) may advantageously comprise, for example, a Z-cut lithium-niobate chip which is used to apply the AC stress on the fiber. By applying an alternating voltage to the metal electrodes deposited on the top and bottom surfaces of the chip the AC stress is generated. The bottom surface of the chip is grounded to the base plate and the top surface is covered with an aluminum plate which is connected to a BNC connector (15). The DC force needed for the squeezer is obtained by supplying an electric current to a solenoid (4) which pushes a rod (34) bearing on the squeezer (3). The amount of force applied can be varied by adjusting the current. The rod (34) pushes a metal ball (36) mounted on top of the upper jaw (13) of the squeezer. Positioning of the squeezer with respect to the fiber is accomplished using micrometer stages (6), (7), and (8).

Figure 5:
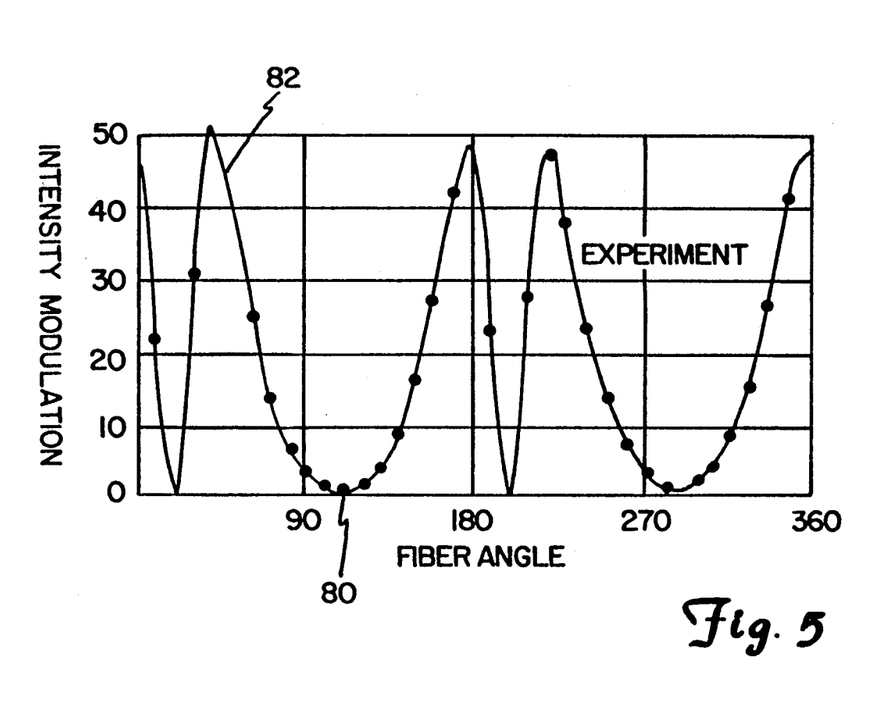
FIG. 5 shows a measured intensity modulation in $\mu$V at the output of the lock-in amplifier verses angle of the rotated fiber.

The detected output (71), which is amplified as shown in FIG. 1, goes through a series of maxima and minima as the fiber is rotated as shown graphically in FIG. 5. The curve (82) detailed in FIG. 5 is an experimental plot of one example of the invention. When the principal axis of the fiber is aligned in the direction of the externally applied stress resulting from the squeezer, a null (80) in the detected output is observed. The slow or fast principal axis of the fiber is identified by the width of the null. Analytical results obtained from a theoretical model are in good agreement with the experimental result shown in FIG. 5.

Figure 11:
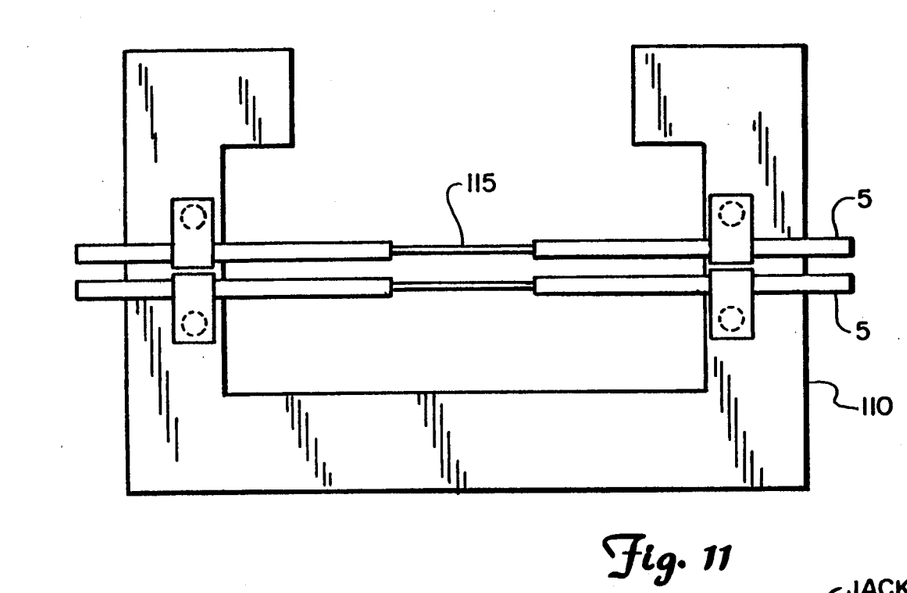
FIG. 11 shows a rectangular frame fiber holding fixture used in the coupler fabrication system.

Referring now to FIG. 11, after aligning the two fibers (5), they are clamped on to a rectangular window type frame (110) to maintain the correct alignment with respect to each other. FIG. 11 shows the two aligned fibers fastened to the rectangular frame (110).

Coupler Fabrication System

Once the fibers are aligned according to the process described hereinabove, the coupler is ready for fusing to form an optical coupler. The apparatus and method of the invention provide for the steps of fusing, followed by tapering and then adjusting the polarization before finally mounting the finished coupler in a housing. The description below first details the equipment used and then describes the operation of the equipment for a better understanding of the invention.

Figure 2:
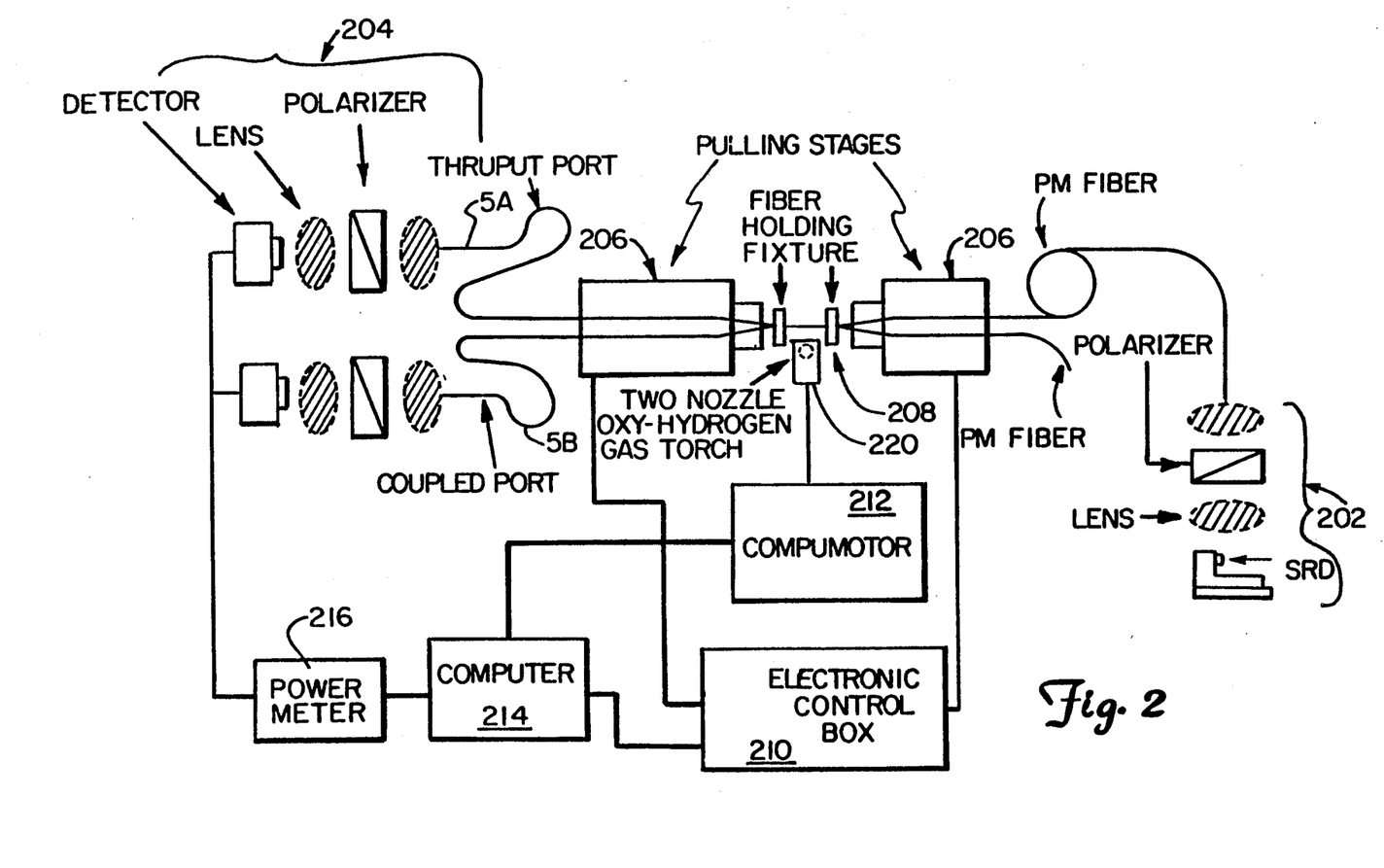
FIG. 2 shows a schematic block diagram of coupler fabrication system.

Referring now to FIG. 2 a coupler fabrication system as provided by the invention is shown including light launching optic (202) and detection optics (204), first and second horizontal pulling stages (206), a fiber holding fixture (208) used during the fusion process, an electronic control box (210) that controls the pulling stages (206), a two nozzle oxy-hydrogen micro gas-torch (220) driven by a compu-motor (212), and a computer (214). The computer (214) interfaces with a power meter (216) which is connected to the detection optics (204). The computer (214) may advantageously be a Hewlett Packard personal computer, for example.

Figure 6:
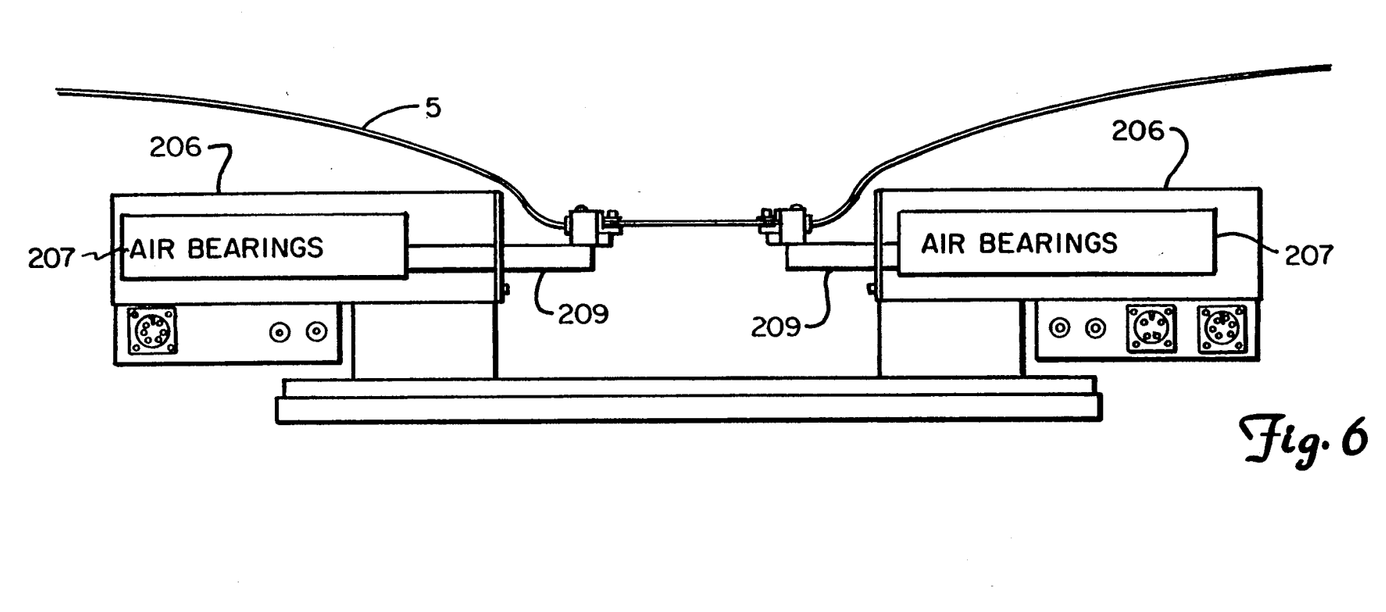
FIG. 6 shows assembled hardware of the coupler pulling station of the coupler fabrication system.
Figure 7:
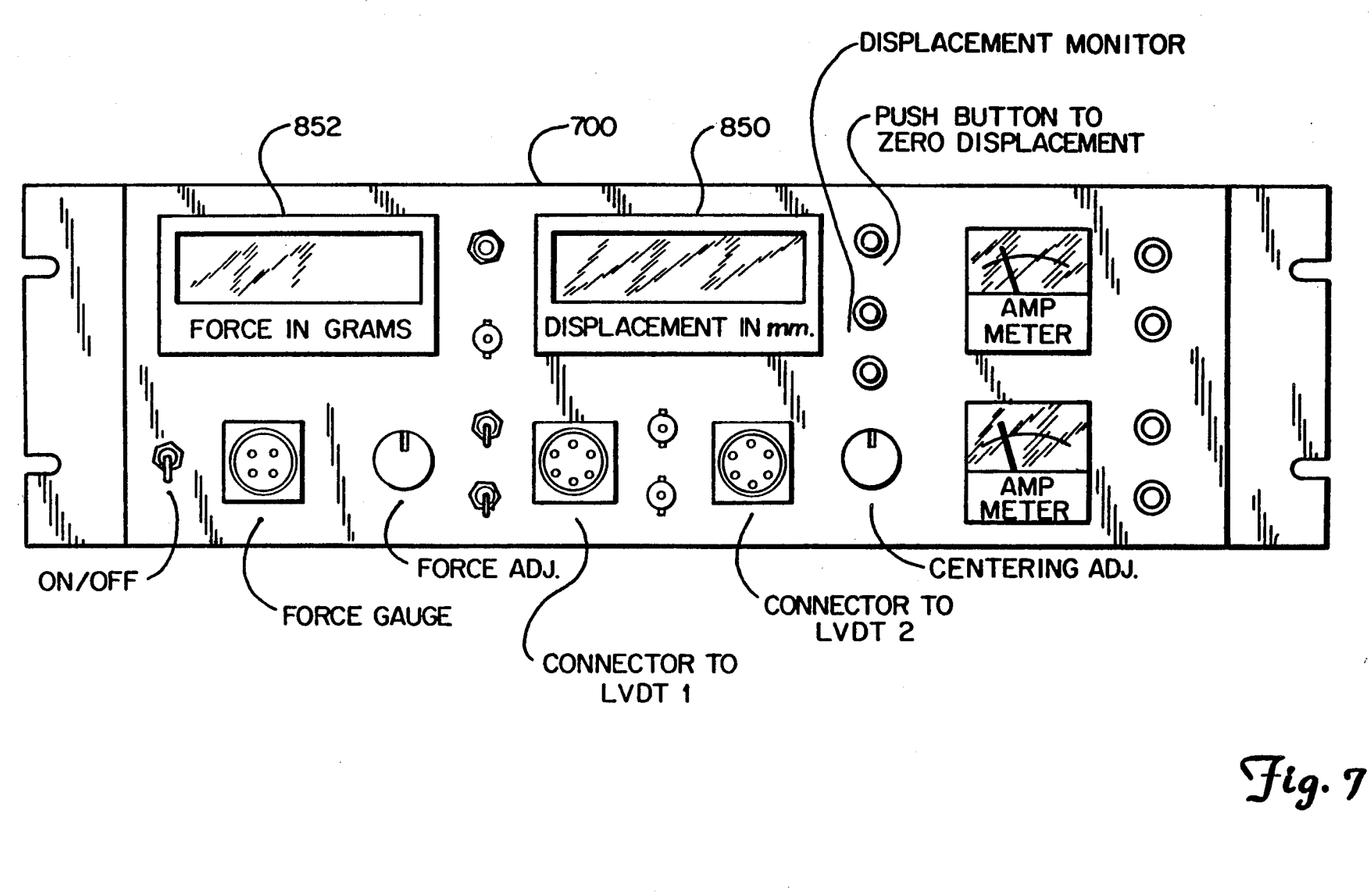
FIG. 7 shows a front panel of the electronic control box of the coupler fabrication system.
Figure 8:
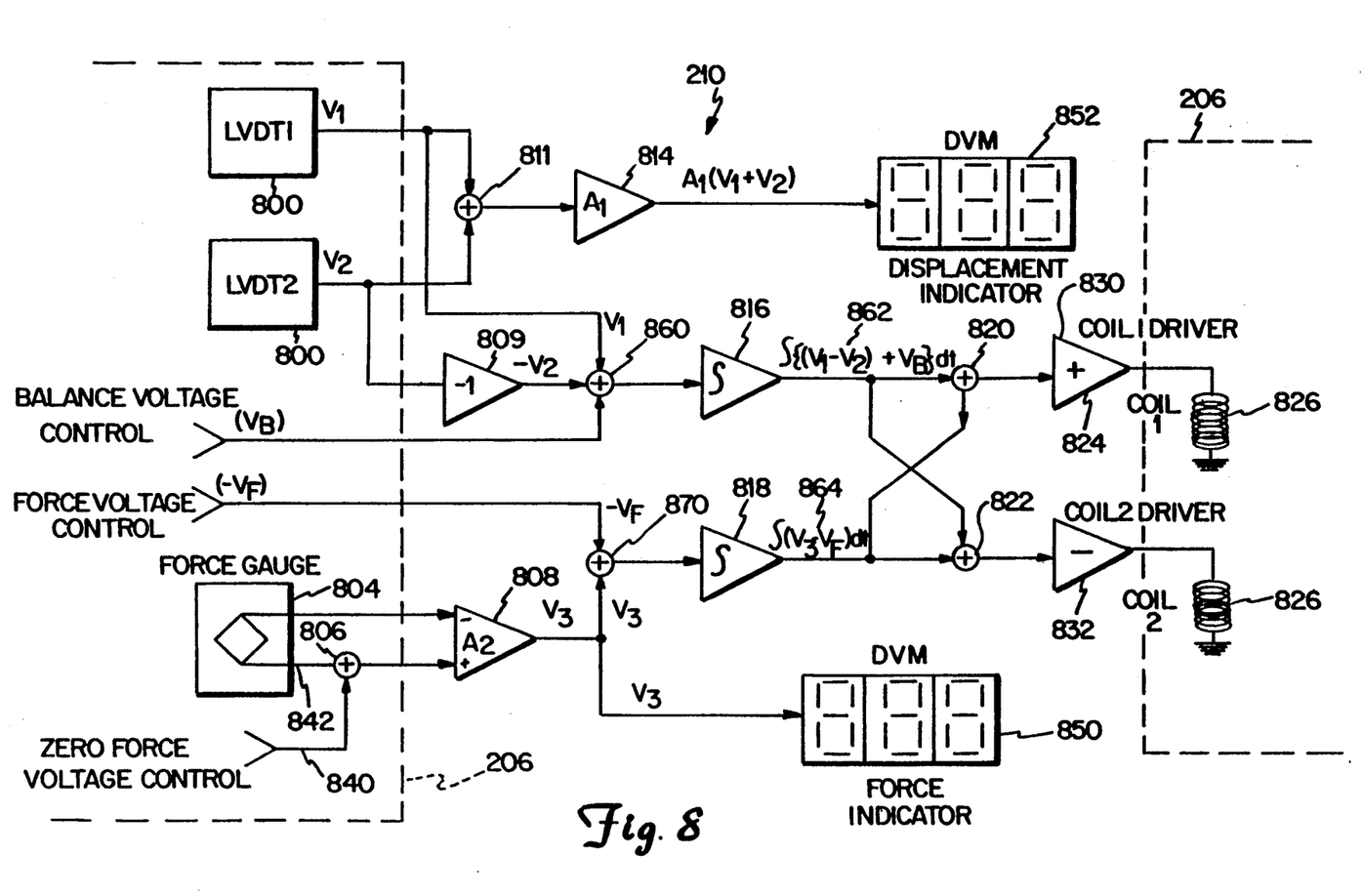
FIG. 8 shows a block diagram of the electronic control box of the coupler fabrication system.

The first and second horizontal coupler pulling stages (206) are shown in more detail in FIGS. 6 and 8. The first and second horizontal pulling stages (206) comprise air bearings (207), first and second linear variable differential transformers (LVDT's) (800) for determining the how much distance the fibers are pulled, first and second electromagnets (826) for supplying the needed force to pull the fibers (5), and a strain gauge or force gauge (804) to measure the force applied. These components are assembled within the first and second pulling stages (206). Silicone fluid with sliders attached to bars (209) which slide in the air bearings (207) advantageously provide dampening needed to stop unwanted oscillations.

Referring now particularly to FIG. 8, the electronic control box and its connections to the pulling stages are shown schematically. The electronic control box (210) allows the user to maintain a constant pulling force on the two sides of the coupler fibers as they are tapered. LVDT1 and LVDT2 provide two output voltages ($V_1$) and ($V_2$) that correspond to the position of sliding bars (209) of the pullers on the right and left sides. The voltages (V1) and (V2) are summed at summing point (811), amplified by a first amplifier (814) and displayed by the displacement indicator DVM (852). The difference of the two voltages ($V_1 - V_2$) is summed with a balance control voltage ($V_B$) at summing point 860 and then integrated through a first integrator (816). The output of the first integrator is a closed-loop displacement error signal (862) that controls first and second electromagnet coil drivers (824), (832) where the first and second coil drivers are of opposite polarity and drive first and second electromagnets 826, here represented by their coils.

The force measured by force gauge (804) provides a signal (842) that is dependent on the fiber pulling force. The signal (842) is, in turn, summed with a zero force control voltage (840) and amplified by a second amplifier (808) to provide a voltage ($V_3$) which is displayed on a force indicator DVM (850). The difference between voltage (V3) and the force control voltage ($V_F$) is produced at summing point (870) and integrated by a second integrator (818) to produce a closed-loop force error signal (864). This signal summed with the displacement error signal (862) comprise a total control voltage which maintains a constant pulling force on the coupler fibers using the two coil drivers (824) and (832).

Figure 9:
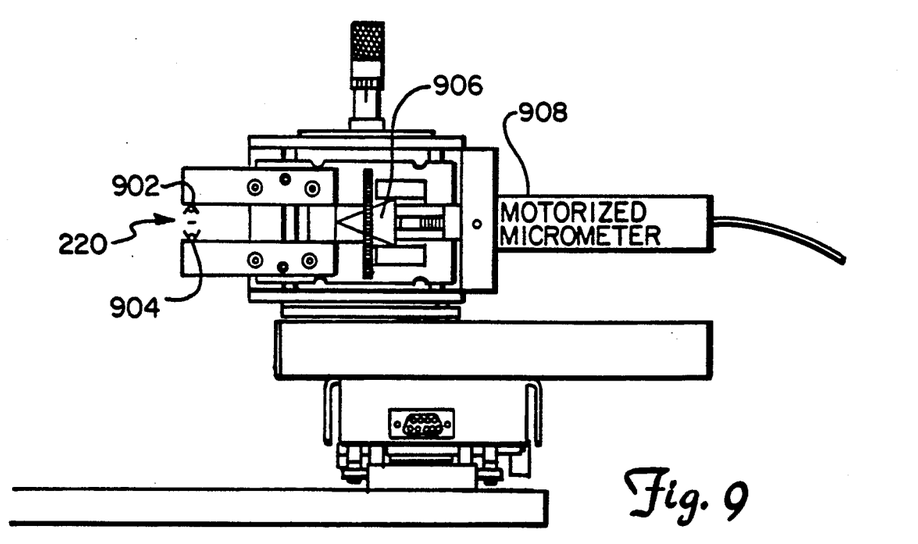
FIG. 9 shows an adjustable two nozzle oxy-hydrogen gas micro-torch for fusion and tapering of fibers of coupler fabrication system.

FIG. 9 shows the two nozzle oxy-hydrogen micro gas torch (220) used in one embodiment of the invention including top and bottom nozzles (902), (904) respectively. The separation between the top and bottom nozzles (902), (904) respectively is controlled by driving a triangular wedge (906) using a motorized micrometer (908). The torch (220) is driven on track and is interfaced with the compu-motor which in-turn controlled by the HP-computer.

Figure 10:
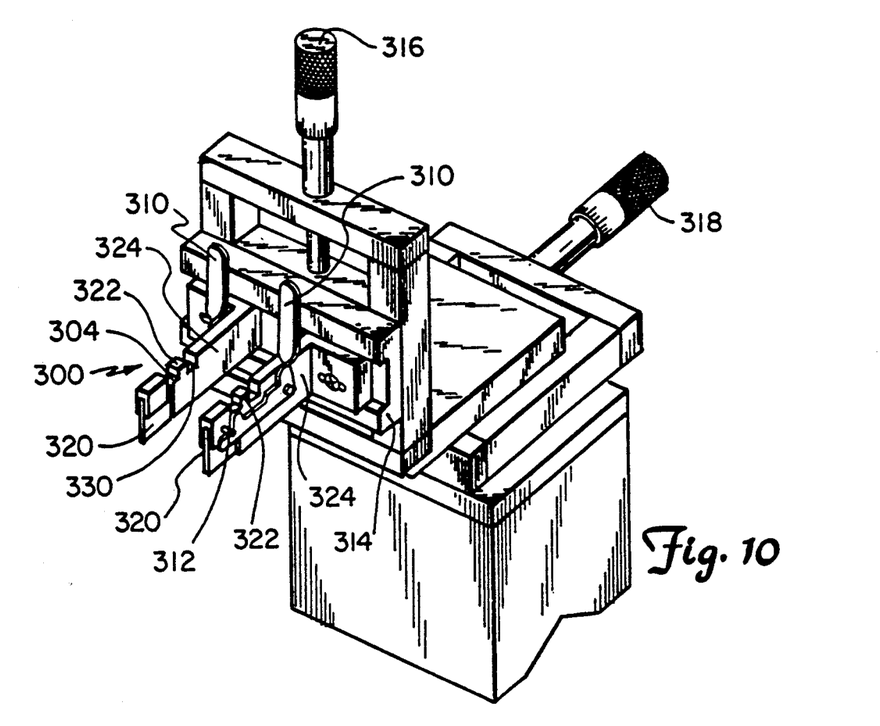
FIG. 10 shows a fiber holding and packaging fixture used during fusing of coupler fibers of the coupler fabrication system.

The fiber holding and packaging fixture for coupler fabrication (300) is shown in FIG. 10. A spring loaded pin (312) controls the position of the movable jaws (320). The plastic jacket stripped and perfectly cleaned optical fibers are brought in contact for fusion by bringing down from vertical to horizontal position of the levers (310). As the levers (310) are brought down the gap (304) becomes smaller holds the fibers in contact between movable jaws (320) are used to hold fused silica coupler housing during the packaging. The width between the two clamps (324) is adjustable using guiding and mounting plate (314). The up and down, and in and out positions of the fiber holding and packaging fixture is adjusted using the micrometer heads (316) and (318), respectively.

Fiber Fusion

Figure 12:
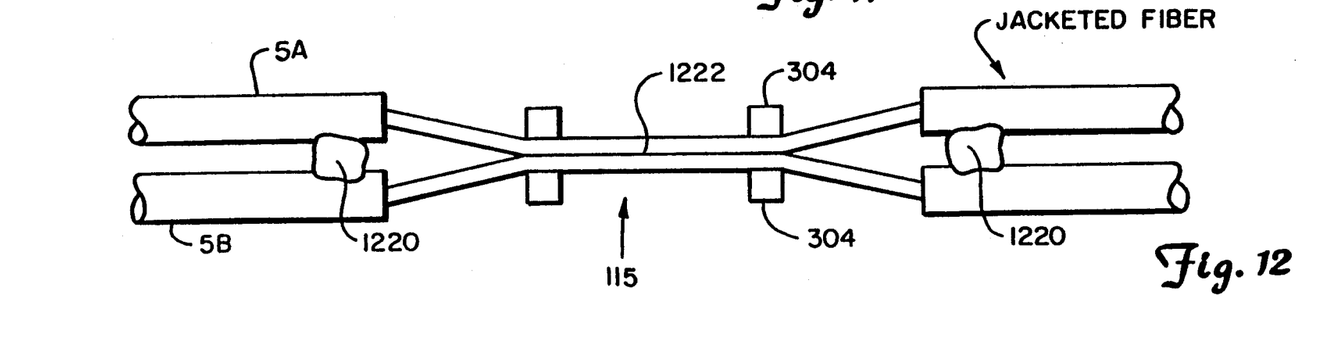
FIG. 12 shows the method of the invention to glue and push together jacketed fiber using the adjustable fiber holding fixture.

Having described the major elements of the apparatus of the invention, the method of operation of the apparatus of the invention with respect to fusion, tapering and adjusting polarity will now be explained to provide a better understanding of the invention. Referring now to FIGS. 11 and 12, an important criterion for a successful coupler fabrication is that the stripped portions of the fibers must be cleaned thoroughly and maintained clean prior to and during the fusion and tapering process. The frame (110) with the two aligned fibers is carried to the fiber fusion-and-tapering station. The fibers are examined under a microscope to determine the cleanliness of the fibers. If any dust particles are observed, they are gently removed by applying methanol with cotton Q-tip. The frame with the a aligned fibers is then placed on the air bearing pullers (with no air supply to the bearings) of the fusion-and-tapering setup such that the fibers are positioned horizontally next to each other and clamped to the two rotatable stages that are attached to the pullers. The rectangular frame (110) is removed leaving the fibers suspended between the pullers with some tension. By using a small amount of epoxy (1220), for example, Norland #81UV Curable epoxy, the jackets of both fibers are glued together. The proximity of the epoxy from the stripped end is typically between 3-4 mm. The central stripped sections (115) of the two fibers are held together touching with the in-house developed adjustable fiber holding fixture (300). The fiber holding fixture (300) is capable of providing a contact between the two fibers under slight tension with no pulling force. FIG. 12 best shows the epoxied jackets of both fibers and the bare section of the fibers held together using the adjustable fiber holding fixture.

A dark line (1222) is usually observed indicating an intimate contact between the two clean fibers held by the adjustable fiber holding fixture. The dark line becomes a crucial factor in deciding the quality of fusion. A linearly polarized light is coupled to the throughput fiber (5A) as shown in FIG. 2 such that the axis of polarization is parallel to the fiber slow or fast axis. The polarization extinction ratio of the throughput fiber (5A) is determined by finding the difference between the maximum and the minimum detected powers, when the output polarizer is parallel and perpendicular to the input light, respectively.

The oxy-hydrogen micro torch (220) driven by the compu-motor (212) with two nozzles (902), (904) centered with respect to the bare fibers is brushed in ever decreasing steps over a range of amplitudes which usually range from 1.3 to 2.6 mm depending on the type of coupler fiber. The fibers are fused by bringing the two nozzles gradually closer to the fibers until a bright white glow is observed in both the fibers. The fusion process is stopped when the fused section of the fibers is close to the shape of a peanut. However, it must be noted that each type of the fiber has a window of fusion that is optimum for yielding low loss and high polarization extinction ratios in the output ports of a coupler. During fusion, the output power of the throughput fiber is monitored in order to detect any power loss due to bending of the fibers. In most cases no power loss is observed, and the fused fibers are ready to taper.

Fiber Tapering

The adjustable fiber holding fixture (300) is lowered and removed, and the fused fibers are rotated by 90 degrees. A force of about 0.3 grams is applied to the fibers by supplying the necessary current to the electromagnets in the pullers, and the needed air is supplied to puller bearings such that no friction is experienced by the sliders during the pulling process. The fused portion of the fibers is tapered with the oxy-hydrogen torch, which is brushed over an amplitude ranging from 2.6 to 3 mm depending on the type of fiber used and the degree of fusion. The separation between the nozzles of the oxy-hydrogen torch is adjusted for gradual tapering of the fibers. The fiber stretching rate, which is approximately equal to 2 mm/5 minutes, is maintained constant during the tapering process. The output power from the two fibers is monitored and stored in the computer. Tapering is stopped when the output power from the two output ports is equal, which generally occurs after a stretch of 5 to 8 mm depending on the strength of fusion.

Figure 13:
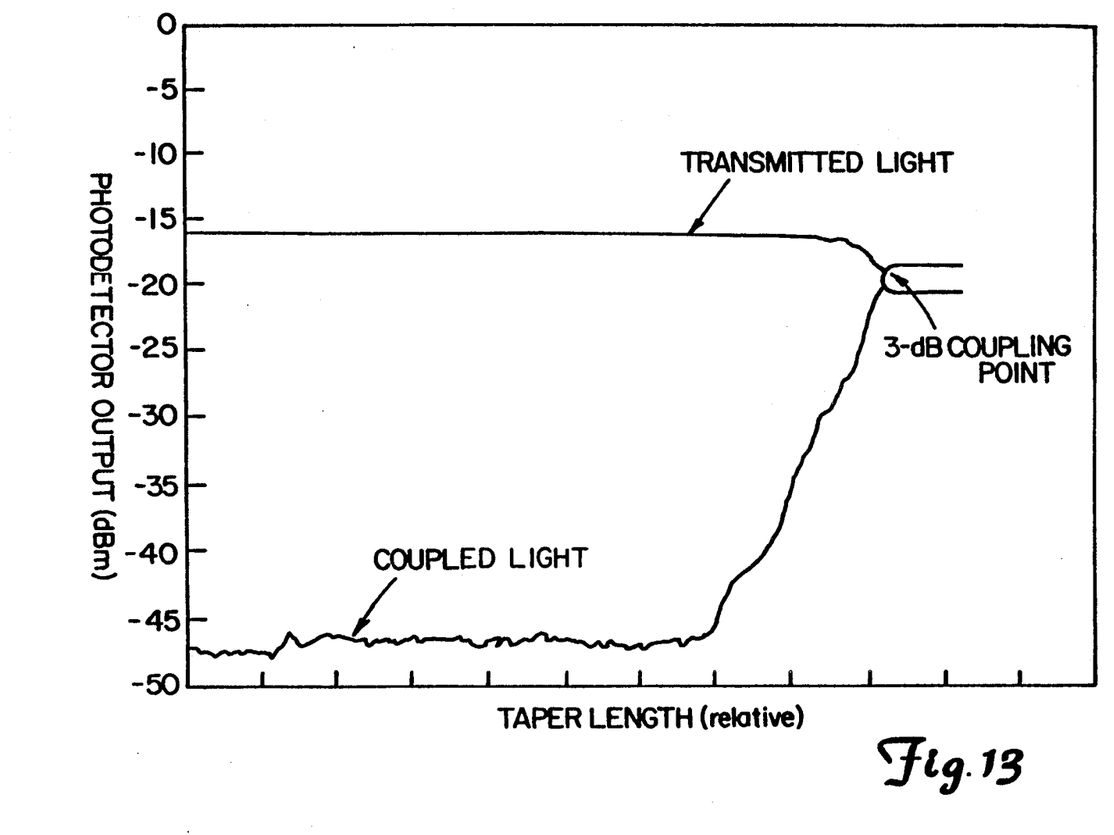
FIG. 13 shows a typical plot of the output power from the two fused and tapered fibers versus tapering length.

A typical plot of the output power from the two parts verses tapering length is shown in FIG. 13. After the tapering process is completed, a preliminary testing of the coupler is done by measuring the excess loss and extinction ratios. The excess loss (L) of the coupler is given by:

$$L = -10\log[(P_1+P_2)/P_t]$$

where $P_1$ is the throughput port output power, $P_2$ is the coupled port power and $P_t$ is total power originally launched into the fiber. Here the power is in milliwatts or microwatts. The polarization extinction ratios of the output ports of the coupler are determined by using the equation:

$$E.R. = (P_f - P_s)$$

where $P_s$ and $P_f$ are minimum and maximum powers in dB, respectively.

After tapering and when the tapered coupler has cooled, the jaws holding the coupler are rotated independently to vary the stress within the coupler and shift the polarization from one fiber to the other to further adjust the extinction ratio, if necessary. Once the optimum extinction ratio has been found, the coupler is held in that position by the fixturing until assembled in a coupler housing.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An apparatus to determine either principal axes of a polarization maintaining optical fiber for use in fabrication of a fused optical coupler prior to fusion, the fused optical coupler including first and second optical fibers which each have a principal axis and a common fused length, the apparatus comprising:

a. means for launching light;
   b. means coupled to the light launching means for focusing the light into a first end of a selected one of the first and second optical fibers;
   c. means for applying external stress to a stripped and cleaned portion of the selected one of the first and second optical fibers that form the common fused length, the external stress comprising a DC and an AC modulation, the DC modulation including a solenoid supplied with a direct current which pushes a rod bearing on the selected fiber, and the AC modulation including a piezoelectric (PZT) element bearing on an opposite side of the selected fiber and electrically modulated to apply AC stress to the selected in cooperation with the solenoid, the external stress resulting in a modulated light selected one of the first and second optical fibers;
   d. means for rotating the selected one of the first and second optical fibers at the common length as the external stress is applied;
   e. means for collimating the modulated light emanating from a second end of the selected one of the first and second optical fibers;
   f. means for analyzing the collimated light;
   g. means coupled to the analyzing means for detecting power of the collimated light; and
   h. means for determining when the principal axis of the selected fiber is aligned in the direction of the externally applied stress by detecting a null output from the power detecting means.

2. The apparatus of claim 1 wherein the means for rotating the selected fiber comprises first and second stepper motors.

3. The apparatus of claim 2 wherein the means for detecting power comprises a photodetector.

4. The apparatus of claim 3 wherein the stepper motors are operated under computer control.

5. The apparatus of claim 4 wherein the solenoid is operated under computer control.

6. The apparatus of claim 5 wherein the means for launching light comprises a super-radiant diode (SRD).

7. A method to determine a principal axis of a polarization maintaining optical fiber for use in fabrication of a fused optical coupler prior to fusion, where the fused optical coupler includes first and second optical fibers which each have a principal axis, comprising the steps of:

a. launching light;
   b. focusing the light into a first end of a selected one of the first and second optical fibers;
   c. applying external stress comprising DC and AC modulation signals to the selected one of the first and second optical fibers resulting in modulated light, the DC modulating signals including a solenoid bearing on the selected fiber and the AC modulating signals including a piezoelectric (PZT) element bearing on an opposite side of the selected fiber to apply AC stress to the selected fiber in cooperation with the solenoid;
   d. rotating the selected one of the first and second optical fibers during application of external stress;
   e. collimating the modulated light emanating from a second end of the selected fiber;
   f. analyzing the collimated light;
   g. detecting power of the collimated light; and
   h. determining when the principal axis of the selected fiber is aligned in the direction of the externally applied stress when a null power output is detected.

8. The method of claim 7 wherein the step of rotating the selected fiber comprises operating first and second stepper motors.

9. The apparatus of claim 8 wherein the step of detecting power comprises operating a photodetector.

10. The method of claim 9 wherein the stepper motors are operated under computer control.

11. The method of claim 10 wherein the solenoid is operated under computer control.

12. The method of claim 11 wherein the step of launching light comprises operating a super-radiant diode (SRD) to launch the light through the selected fiber.

13. A method for aligning a first and second polarization maintaining optical fibers along a principal axis of each optical fiber for use in fabrication of a fused optical coupler, the method comprising the steps of:
   a. launching light;
   b. focusing the light into a first end of the first optical fiber;
   c. applying external stress comprising DC and AC modulation to the first optical fiber resulting in modulated light;
   d. rotating the first optical fiber during application of external stress;
   e. collimating the modulated light emanating from a second end of the first optical fiber;
   f. analyzing the collimated light;
   g. detecting power of the collimated light;
   h. determining when the principal axis of the selected fiber is aligned in the direction of the externally applied stress when a null power output is detected;
   i. mounting the second optical fiber adjacent to the first optical fiber; and
   j. processing the second optical fiber in accordance with steps a–h, whereby the first and second optical fibers are aligned along the principal axis of each optical fiber.

14. A method according to the steps of claim 13, wherein the rotating step includes the step of operating a first and second stepper motor coupled to the first and second end of the first optical fiber, the stepper motors operated under computer control.

15. A method according to claim 13, wherein the step of applying external stress includes the steps of:
   DC modulating a solenoid bearing on the first optical fiber; and
   AC modulating a piezoelectric (PZT) element bearing on an opposite side of the first optical fiber to apply AC stress to the first optical fiber in cooperation with the solenoid.

16. An apparatus for alignment of first and second polarization maintaining optical fibers for use in fabrication of a fused optical coupler, the fused optical coupler including the first and second polarization maintaining optical fibers, each optical fiber having a principal axis, the apparatus comprising:
   a. means for launching light;
   b. means for focusing the light into a first end of each of the first and second optical fibers;
   c. means for applying external stress, including DC and AC modulations, to the first and second optical fibers, the external stress resulting in a modulated light;
   d. means for rotating the first and second optical fibers as the external stress is applied thereto;
   e. means for collimating the modulated light emanating from a second end of each of the first and second optical fibers;
   f. means for detecting power of the collimated light and generating output signals representative thereof;
   g. control means for controlling the rotation of the first and second optical fibers in response to the output signals representative of the detected power;
   h. means for determining when the principal axis of each of the first and second optical fibers are aligned in the direction of the externally applied stress by detecting a null output from the power detecting means; and
   i. means for maintaining alignment of the first and second optical fibers with respect to each other along the principal axis of each optical fiber.

17. An apparatus according to claim 16, wherein the DC modulation includes a solenoid supplied with a direct current which pushes a rod bearing on the first and second optical fiber, wherein the AC modulation includes a piezoelectric (PZT) element bearing on an opposite side of the first and second optical fiber and electrically modulated to apply AC stress to the first and second optical fiber in cooperation with the solenoid, and further wherein said rotating means includes first and second stepper motors coupled to the first end and second end of each of the first and second optical fibers.

* * * * *